United States Patent [19]
Schedrat et al.

[11] Patent Number: 5,526,702
[45] Date of Patent: * Jun. 18, 1996

[54] ARRANGEMENT OF MEASURING DEVICES ON A SEMITRAILER MOTOR VEHICLE

[75] Inventors: Kurt Schedrat, Gaienhofen; Lothar Jakob, Blumberg; Dirk Engels, Tengen, all of Germany

[73] Assignee: Georg Fischer Verkehrstechnik GmbH, Singen, Germany

[*] Notice: The portion of the term of this patent subsequent to Feb. 16, 2014, has been disclaimed.

[21] Appl. No.: 197,148

[22] Filed: Feb. 16, 1994

[30] Foreign Application Priority Data

Feb. 17, 1993 [CH] Switzerland ............................. 490/93

[51] Int. Cl.⁶ .............................. G01G 19/08; G01L 5/16
[52] U.S. Cl. .................. 73/862.57; 73/862.045; 73/862.541; 177/136; 177/211
[58] Field of Search ............. 73/862.03, 862.041, 73/862.045, 862.541, 862.57, 862.381, 862.632, 862.628; 177/211, 136

[56] References Cited

U.S. PATENT DOCUMENTS

| | | | |
|---|---|---|---|
| 3,603,418 | 9/1971 | Schmidt et al. | 73/862.628 |
| 3,661,220 | 5/1972 | Harris | 73/862.632 |
| 3,854,540 | 12/1974 | Holmstrom, Jr. | 73/862.045 |
| 3,857,452 | 12/1974 | Hartman | 73/862.541 |
| 4,319,766 | 3/1982 | Corteg et al. | 73/862.57 |
| 4,492,280 | 1/1985 | Susor | 73/862.628 |
| 4,573,362 | 3/1986 | Amlani | 73/862.045 |
| 4,635,479 | 1/1987 | Salisbury, Jr. et al. | 73/862.045 |
| 4,666,003 | 5/1987 | Reichaw | 73/862.632 |
| 4,864,874 | 9/1989 | Häfner | 73/862.57 |
| 4,974,454 | 12/1990 | Wolfer et al. | 73/862.541 |

FOREIGN PATENT DOCUMENTS

| | | | |
|---|---|---|---|
| 0302437 | 2/1989 | European Pat. Off. | 73/862.57 |
| 2206647A | 10/1972 | Germany | 73/862.541 |
| 2094984 | 9/1982 | United Kingdom | 73/862.57 |

*Primary Examiner*—Richard Chilcot
*Assistant Examiner*—George M. Dombroske
*Attorney, Agent, or Firm*—Bachman & LaPointe

[57] ABSTRACT

The present invention relates to an arrangement of measurement devices on a semitrailer motor vehicle having a tractive unit, a semitrailer unit, and a fifth wheel fastened to the tractive unit. The measuring arrangement includes a support structure for the fifth wheel and measurement devices for measuring forces arising between the semitrailer and the tractive unit attached to the support structure. The measurement devices preferably measure acceleration, tractive or braking forces and/or the weight of the semitrailer.

8 Claims, 2 Drawing Sheets

ARRANGEMENT OF MEASURING DEVICES ON A SEMITRAILER MOTOR VEHICLE

BACKGROUND OF THE INVENTION

The present invention relates to an arrangement of measuring devices on a semitrailer motor vehicle having a tractive unit, a semitrailer and a fifth wheel fastened to the tractive unit for influencing and improving the driving behavior of the vehicle.

It is a known practice to provide semitrailer motor vehicles having a fifth wheel with measuring devices for measuring the wear on certain parts. This is done so that reliable operation may be guaranteed through early replacement of worn parts.

From a safety standpoint, it is also desirable to measure certain forces arising between the semitrailer and the tractive unit to improve the driving behavior of the vehicle. These forces include acceleration, tractive and braking forces and the weight of the semitrailer.

Accordingly, it is a principal object of the present invention to provide an arrangement of measuring devices by means of which an influencing and improvement of the driving behavior of the vehicle can be achieved for different loads.

Further objects and advantages of the present invention will appear herein below.

SUMMARY OF THE INVENTION

The present invention relates to an arrangement of measuring devices on a semitrailer motor vehicle for measuring forces which arise between the semitrailer and the tractive unit to improve the driving behavior of the vehicle.

Broadly, the measuring device arrangement of the present invention comprises a support structure for a fifth wheel fastened to the tractive unit and means for measuring forces which arise between the semitrailer and the tractive unit. The measuring means are attached to the support structure. In a first embodiment of the present invention, the support structure includes an intermediate plate fastened to the tractive unit and the measuring means includes measurement devices disposed at opposed ends of the intermediate plate. In a second embodiment of the present invention the support structure includes a mounting plate secured to the tractive unit and a connection device for fastening the fifth wheel to the mounting plate. In this embodiment, the measuring means is disposed between the connection device and the mounting plate. In still another embodiment of the present invention, the support structure includes bearing blocks and an intermediate plate supported on the bearing blocks. In this embodiment, the intermediate plate is provided with bearing webs and carries the fifth wheel. Additionally, it is also supported by bearing pins. The measuring means in this embodiment are disposed on at least one of the bearing pins. Still other embodiments and features of the measuring arrangement of the present invention are set forth in the following description and the accompanying drawings. The specific measuring arrangements set forth herein are superior to the measuring arrangements heretofore known in the art.

DETAILED DESCRIPTION

Figure 1:
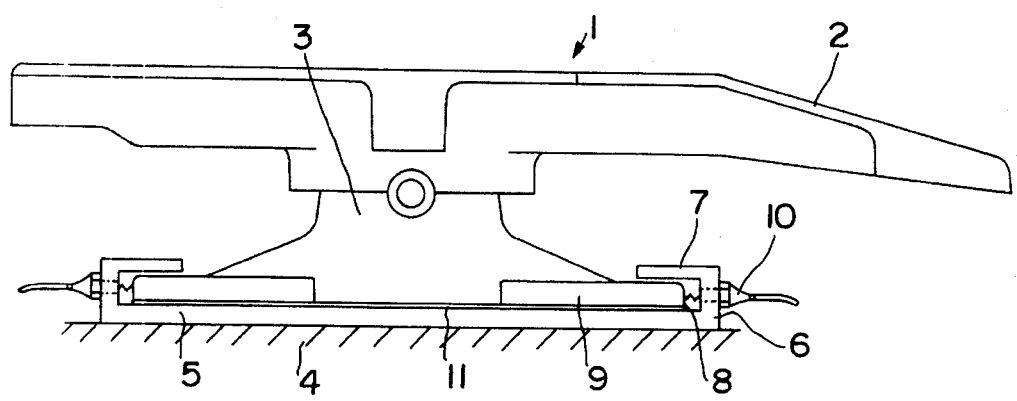
FIG. 1 is a side view of a first embodiment of a measuring arrangement for a fifth wheel of a semitrailer motor vehicle having an intermediate plate between the fifth wheel and a tractive unit.

Referring now to the drawings, FIG. 1 shows a fifth wheel 1 for use with a semitrailer motor vehicle having a semitrailer (not shown) and a tractive unit. The fifth wheel includes a coupling plate 2 pivotally disposed on a bearing block 3 having supporting flanges 9. Fastened to a tractive unit 4 of the semitrailer motor vehicle is an intermediate plate 5. The bearing block 3 of the fifth wheel 1 is preferably disposed on the intermediate plate 5 so as to be slightly displaceable in a direction substantially parallel to a longitudinal axis of the semitrailer motor vehicle. Each end of the intermediate plate 5 is U-shaped and includes a web portion 6 and a rail portion 7. The U-shaped ends prevent tilting or lifting of the bearing block and hence the fifth wheel 1 from the intermediate plate 5.

Measuring devices 10 are disposed on the webs 6. The measuring devices 10 are operationally connected to and supported on end faces 8 of the supporting flanges 9 of the bearing block 3 and are used to measure forces which arise as a result of tractive forces, acceleration forces and braking forces acting on the semitrailer motor vehicle. The measuring devices 10 may be either force sensors or position sensors. When position sensors are used for the measuring devices 10, pressure springs having defined spring constants are positioned between the web 6 and the supporting flange 9 so that force measurement is effected by way of the position measurement.

To make force measurement by the measuring devices 10 as accurate as possible, a support 11 is preferably positioned between bearing block 3 and intermediate plate 5. Preferably, the support 11 has a low-friction design, such as a plastic coating on the support or rolling elements (not shown), incorporated therein. The force values measured by the measuring devices 10 are fed to an evaluation device (not shown) for varying and improving the driving behavior of the vehicle.

Figure 2:
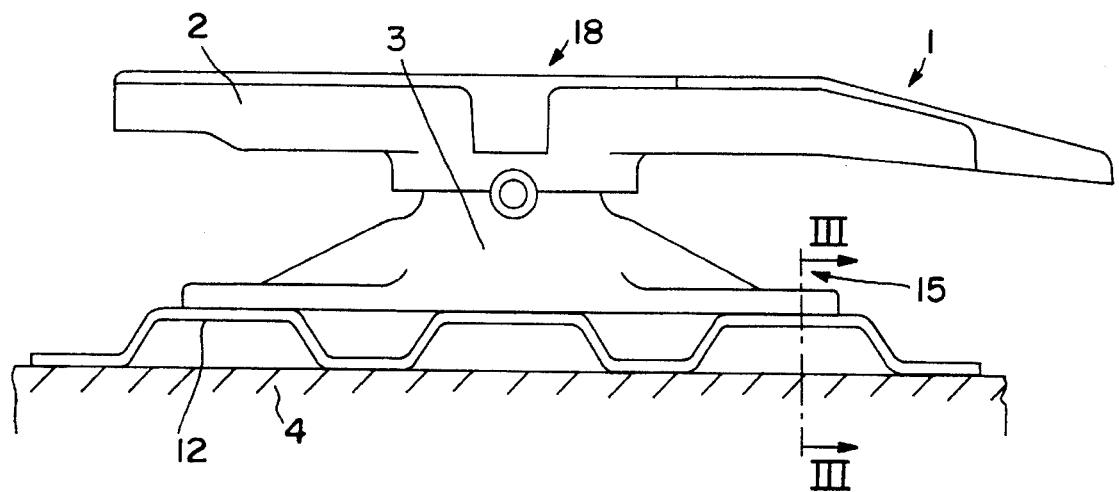
FIG. 2 is a side view of an alternative embodiment of a measuring arrangement for a fifth wheel mounted to the tractive unit by a mounting plate.

FIG. 2 illustrates another embodiment of an arrangement for mounting a fifth wheel to a tractive unit 4. In this arrangement, the fifth wheel 1 is disposed with its bearing block 3 on a mounting plate 12 for height adjustment. The plate 12 is fastened by screw connections to the tractive unit 4.

Measuring devices 13 and 14 for measuring forces which arise between the semitrailer and the tractive unit are disposed at one or more of the screw connections 15 for fastening the bearing block 3 to the mounting plate 12.

Preferably, the measuring devices 13 and 14 are positioned at a plurality of screw connections 15. In a preferred embodiment, the measuring devices take the form of force sensors.

Figure 3:
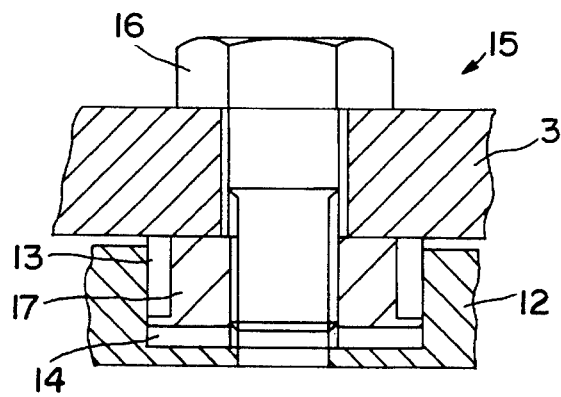
FIG. 3 is a sectional view taken along line III—III of FIG. 2.
Figure 4:
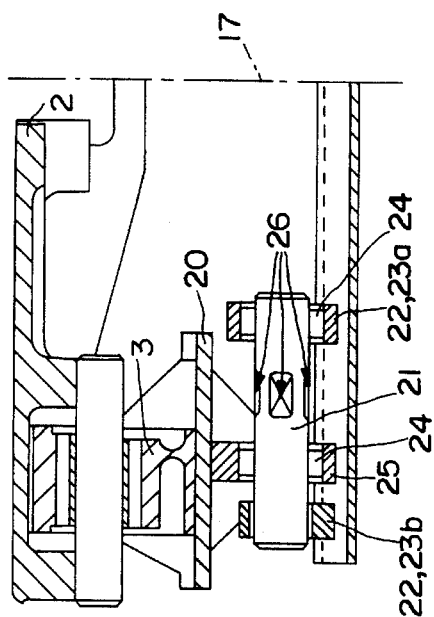
FIG. 4 is a side view of an alternative arrangement for mounting a fifth wheel to a tractive unit.

FIG. 3 shows a screw connection 15 for fastening the bearing block 3 to the mounting plate 12. The connection 15 includes a ring part 17 provided with a thread and a screw 16 which is screwed into the ring part 17. The ring part 17 has along its periphery measuring devices 13, such as force sensors, for measuring horizontal acceleration and/or braking forces and along its bottom face, measuring devices 14, such as force sensors, for measuring the weight of the semitrailer 18. The ring part 17 having the measuring devices 13 and 14 may be connected to the mounting plate 12 by any suitable means known in the art.

As before, the forces measured by devices 13 and 14 are fed to an evaluation device (not shown) and used to influence and improve the driving behavior of the vehicel.

Figure 5:
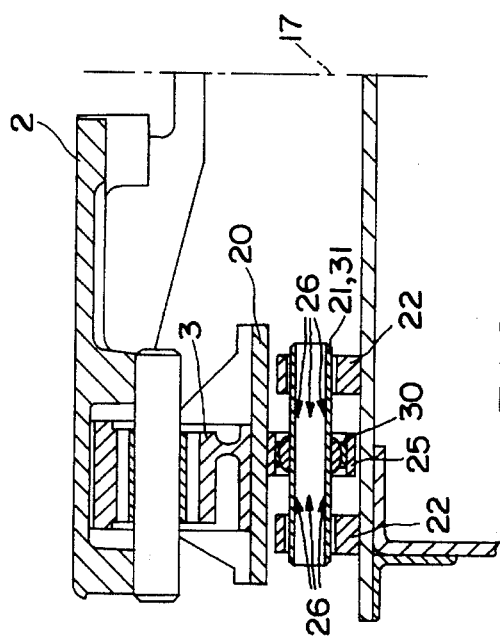
FIG. 5 is a sectional view taken along line V—V of FIG. 4 illustrating another measuring device arrangement embodiment.

FIGS. 4 to 7 show other arrangements for mounting a fifth wheel 1 to a tractive unit 4 and measuring arrangements therefor. In these arrangements, the fifth wheel 1 and its coupling plate 2 are connected to an intermediate plate 20 which is supported by means of one or more bearing pins 21 in bearing blocks 22 on the tractive unit 4. In the embodiment shown in FIGS. 4 and 5, two bearing blocks 22 are fastened on each side of the middle 77 of the tractive unit 4 to a mounting plate 12. As shown in FIG. 5, a bearing pin 21 is disposed between the two bearing blocks 22. The bearing pin 21 is disposed in bearing eyes 23a and 23b of the bearing blocks 22 and is connected to one of the bearing eyes 23a in a non-rotatable manner, such as by means of one or more clamping elements 24. In the other bearing eye 23b, the bearing pin 21 is supported in a freely rotatable manner. The intermediate plate 20 is connected in a non-rotatable manner to the bearing pin 21 by means of a bearing web 25, which is disposed or positioned between the bearing eyes 23a and 23b, and a clamping element 24.

As shown in FIG. 5, measuring devices 26 are located between bearing eye 23a and bearing web 25. The measuring devices 26 are distributed over the periphery of the bearing pin 21 and are preferably force sensors, such a strain gauges.

Acceleration, tractive and braking forces acting on the vehicle give rise to tilting moments 27 which act upon the intermediate plate 20. The bearing arrangement described above in connection with FIG. 4 is designed to absorb such tilting moments. As a result, the tilting moments are directed through the non-rotatable connection into the bearing pin 21. The torsional stresses arising there are measured by the measuring devices 26 and fed to an evaluation device (not shown) for influencing and improving the driving behavior of the vehicle.

If desired, the weight of the semitrailer may be determined by providing measuring devices, such as strain gauges, for measuring the bending stresses arising in the bearing pin 21.

Figure 6:
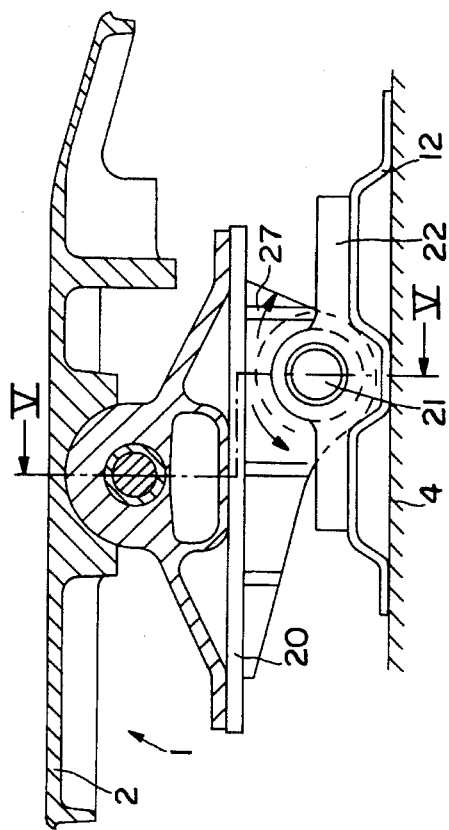
FIG. 6 is a side view of still another arrangement for mounting a fifth wheel to a tractive unit.
Figure 7:
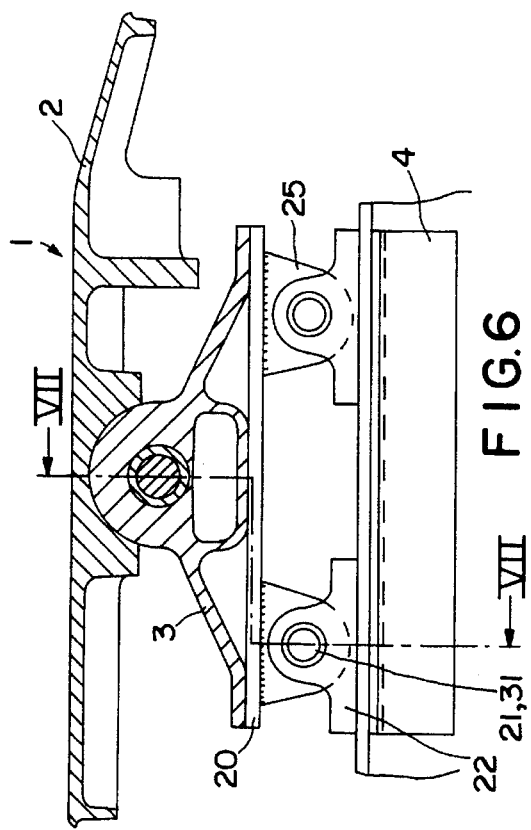
FIG. 7 is a sectional view taken along line VII—VII of FIG. 6 showing yet another embodiment of a measuring device arrangement.

In the embodiment shown in FIGS. 6 and 7, the intermediate plate 20 is disposed on each side of the middle 77 of the tractive unit 4 on at least two bearing pins 21, preferably on four such bearing pins, which pins are firmly connected by bearing blocks 22 to the tractive unit 4. As shown in FIG. 7, mounting of the intermediate plate 20 on each bearing pin 21 is effected centrally between two bearing blocks 22 by means of one or more roller or sliding bearings 30 disposed in a bearing web 25. Preferably, the bearing pins 21 are formed by tubes 31. This arrangement of bearing components is designed for direct absorption of acceleration and braking forces which act in a longitudinal direction of the tractive unit.

Measuring devices 26 are disposed inbetween the bearing blocks 22 on either side of the bearing 30. In a preferred embodiment, the measuring devices 26 are strain gauges distributed over and fastened to the inner periphery of each tube 31.

Acceleration, tractive and braking forces as well as the weight of the semitrailer are transmitted by the fifth wheel 1 via the intermediate plate 20 to the bearing pins 21 where they act as bending forces. The bending stresses acting on each bearing pin 21 are measured by the measuring devices 26 and fed to the evaluation device (not shown) for influencing and improving the driving behavior of the vehicle.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirits and scope as defined by the claims.

What is claimed is:

1. An arrangement of measuring devices on a semitrailer motor vehicle having a semitrailer, a tractive unit and a fifth wheel fastened to the tractive unit, said arrangement comprising a support structure for said fifth wheel and means for measuring forces arising between said semitrailer and said tractive unit, said support structure includes a bearing block for supporting said fifth wheel, said connection device includes a ring part and means for fastening said bearing block to said ring part, and said measuring means being arranged about the periphery of said ring part so as to surround same.

2. An arrangement according to claim 1 wherein said measuring means includes means for measuring at least one of horizontal acceleration and braking forces along side portions of said ring part and means for measuring the weight of the semitrailer along a bottom face of said ring part.

3. An arrangement of measuring devices on a semitrailer motor vehicle having a semitrailer, a tractive unit and a fifth wheel fastened to the tractive unit, said arrangement comprising a support structure for said fifth wheel and means for measuring forces arising between said semitrailer and said tractive unit, said support structure includes an intermediate plate fastened to the tractive unit wherein the intermediate plate has opposed ends, said fifth wheel is disposed in a longitudinally displaceable manner on said intermediate plate wherein each of said ends of said intermediate plate being U-shaped and including a web portion and a rail portion and said measuring means being disposed on said web portion.

4. An arrangement according to claim 3 further comprising said support structure including a bearing block and a low-friction support between said bearing block and said intermediate plate.

5. An arrangement according to claim 3 wherein said measuring means comprise at least one of force sensors and position sensors.

6. An arrangement of measuring devices on a semitrailer motor vehicle having a semitrailer, a tractive unit and a fifth wheel fastened to the tractive unit, said arrangement comprising a support structure for said fifth wheel and means for measuring forces arising between said semitrailer and said tractive unit, said support structure including bearing blocks and an intermediate plate supported on said bearing blocks, said intermediate plate being provided with bearing webs and carrying said fifth wheel, said intermediate plate being supported by bearing pins, and said measuring means being disposed on at least one of the bearing pins.

7. An arrangement according to claim 6, further comprising a bearing arrangement supporting the intermediate plate on the bearing pins, said bearing arrangement being designed to absorb tilting moments arising as a result of acceleration or braking forces, and said measuring means comprising strain gauges disposed on the at least one bearing pin for measuring torsional stresses.

8. An arrangement according to claim 6, further comprising a bearing arrangement supporting the intermediate plate on the bearing pins, said bearing arrangement being designed for direct absorption of acceleration and braking forces effective in a longitudinal direction of the tractive unit, and the measuring means comprising strain gauges for measuring bending stresses disposed on the at least one bearing pin.

* * * * *